(12) United States Patent
Vasseur et al.

(10) Patent No.: US 11,729,210 B2
(45) Date of Patent: Aug. 15, 2023

(54) DETECTING SPOOFING IN DEVICE CLASSIFICATION SYSTEMS

(71) Applicant: Cisco Technology, Inc., San Jose, CA (US)

(72) Inventors: Jean-Philippe Vasseur, Saint Martin d'uriage (FR); Pierre-André Savalle, Rueil-Malmaison (FR); Grégory Mermoud, Veyras (CH); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 16/851,290

(22) Filed: Apr. 17, 2020

(65) Prior Publication Data

US 2021/0329029 A1    Oct. 21, 2021

(51) Int. Cl.
*H04L 9/40* (2022.01)
*H04L 43/065* (2022.01)
*H04L 43/12* (2022.01)
*G06N 3/047* (2023.01)

(52) U.S. Cl.
CPC ......... *H04L 63/1466* (2013.01); *G06N 3/047* (2023.01); *H04L 43/065* (2013.01); *H04L 43/12* (2013.01); *H04L 63/0263* (2013.01); *H04L 63/1425* (2013.01)

(58) Field of Classification Search
CPC ... H04L 63/1466; H04L 43/065; H04L 43/12; H04L 63/0263; H04L 63/1425; H04L 41/0853; H04L 41/16; G06N 3/0472; G06N 5/003; G06N 20/10; G06N 20/20; G06N 3/0454; G06N 3/088
See application file for complete search history.

(56) References Cited

U.S. PATENT DOCUMENTS 7,554,983 B1 * 6/2009 Muppala ............ H04L 41/0896
370/410
10,587,621 B2 3/2020 Ponnuswamy et al.
(Continued)

FOREIGN PATENT DOCUMENTS

WO    WO-19172762 A1    9/2019

OTHER PUBLICATIONS

Hamza Aldabbas and Rashid Amin, "A novel mechanism to handle address spoofing attacks in SDN based IoT", Cluster Computing, Https;//doi.org/10.1007/s10586-021-03309-0 (Year: 2020).*
(Continued)

*Primary Examiner* — Aftab N. Khan
(74) *Attorney, Agent, or Firm* — Behmke Innovation Group LLC; Kenneth J. Heywood; Jonathon P. Western

(57) ABSTRACT

In various embodiments, a device classification service obtains device telemetry data indicative of declarative attributes of a device in a network and indicative of behavioral attributes of that device. The device classification service labels the device with a device type, based on the device telemetry data. The device classification service detects device type spoofing exhibited by the device using a model that models a relationship between the declarative attributes and the behavioral attributes. The device classification service initiates, based on the device type spoofing, a mitigation action regarding the device.

16 Claims, 14 Drawing Sheets

(56) References Cited

U.S. PATENT DOCUMENTS

| | | | |
|---|---|---|---|
| 2009/0287936 A1* | 11/2009 | Ohkado | G06F 21/33 |
| | | | 726/6 |
| 2016/0192199 A1* | 6/2016 | Alvarez Dominguez | |
| | | | H04L 63/1408 |
| | | | 455/410 |
| 2017/0208079 A1* | 7/2017 | Cammarota | H04L 63/1425 |
| 2017/0230410 A1* | 8/2017 | Hassanzadeh | G06N 20/00 |
| 2018/0357051 A1* | 12/2018 | Puszkiewicz | G06F 9/45512 |
| 2019/0132344 A1 | 5/2019 | Lem et al. | |
| 2019/0230119 A1* | 7/2019 | Mestha | H04L 63/1416 |
| 2020/0067935 A1* | 2/2020 | Carnes, III | H04L 63/101 |
| 2020/0327818 A1* | 10/2020 | Byron | G09B 7/02 |
| 2020/0380522 A1* | 12/2020 | Perkal | G06F 9/547 |
| 2020/0404010 A1* | 12/2020 | Costante | H04L 63/0236 |

OTHER PUBLICATIONS

Arunan Sivanathan, "IOT Behavioral monitoring via network traffic analysis" pp. 1-161, Jan. 28, 2020 (Year: 2020).*

Lear, et al., "Manufacturer Usage Description Specification", https://tools.ietf.org/html/rfc8520, Request for Comments 8520, Mar. 2019, 60 pages, IETF Trust.

Sivanathan, Arunan, "IoT Behavioral Monitoring via Network Traffic Analysis", School of Electrical Engineering and Telecommunications, UNSW Dissertaion, Sep. 2019, 180 pages, Australia.

"CDP Spoofing", https://en.wikipedia.org/wiki/CDP_spoofing, Jan. 2020, 3 pages, Wikimedia Foundation, Inc.

* cited by examiner

DETECTING SPOOFING IN DEVICE CLASSIFICATION SYSTEMS

TECHNICAL FIELD

The present disclosure relates generally to computer networks, and, more particularly, to detecting spoofing in device classification systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior.

Unfortunately, device classification systems are not immune to attacks by adversarial/malicious endpoints in a network that spoof the attributes and behaviors of benign devices. In cases in which the device type classification drives policies for the device, this can lead to the malicious device gaining greater permissions or access than it otherwise would. In more subtle forms of attack, a malicious endpoint may not even attempt to gain greater access in the network, but instead alter how the classification service classifies devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
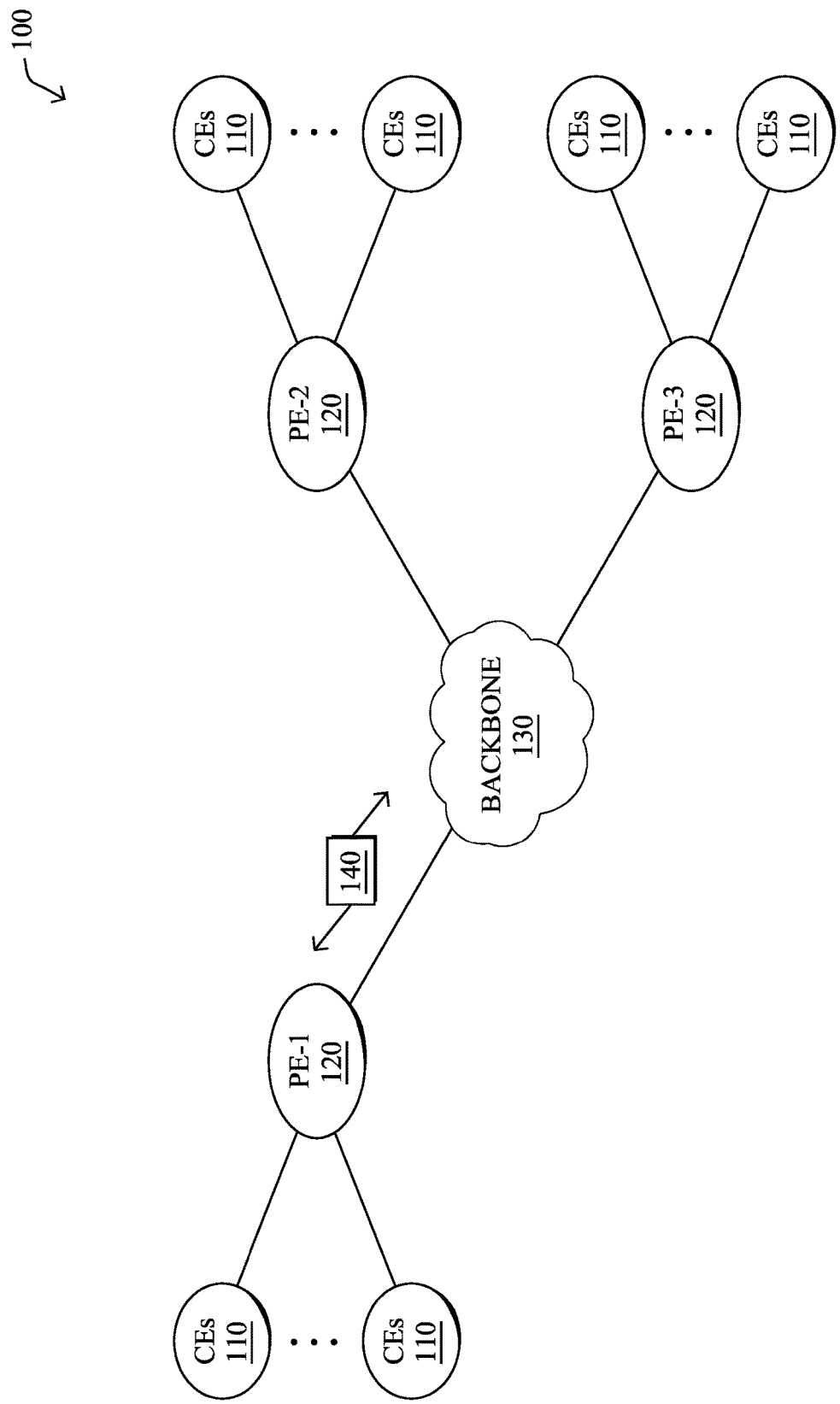
FIGS. 1A-1B illustrate an example communication network.

According to one or more embodiments of the disclosure, a device classification service obtains device telemetry data indicative of declarative attributes of a device in a network and indicative of behavioral attributes of that device. The device classification service labels the device with a device type, based on the device telemetry data. The device classification service detects device type spoofing exhibited by the device using a model that models a relationship between the declarative attributes and the behavioral attributes. The device classification service initiates, based on the device type spoofing, a mitigation action regarding the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
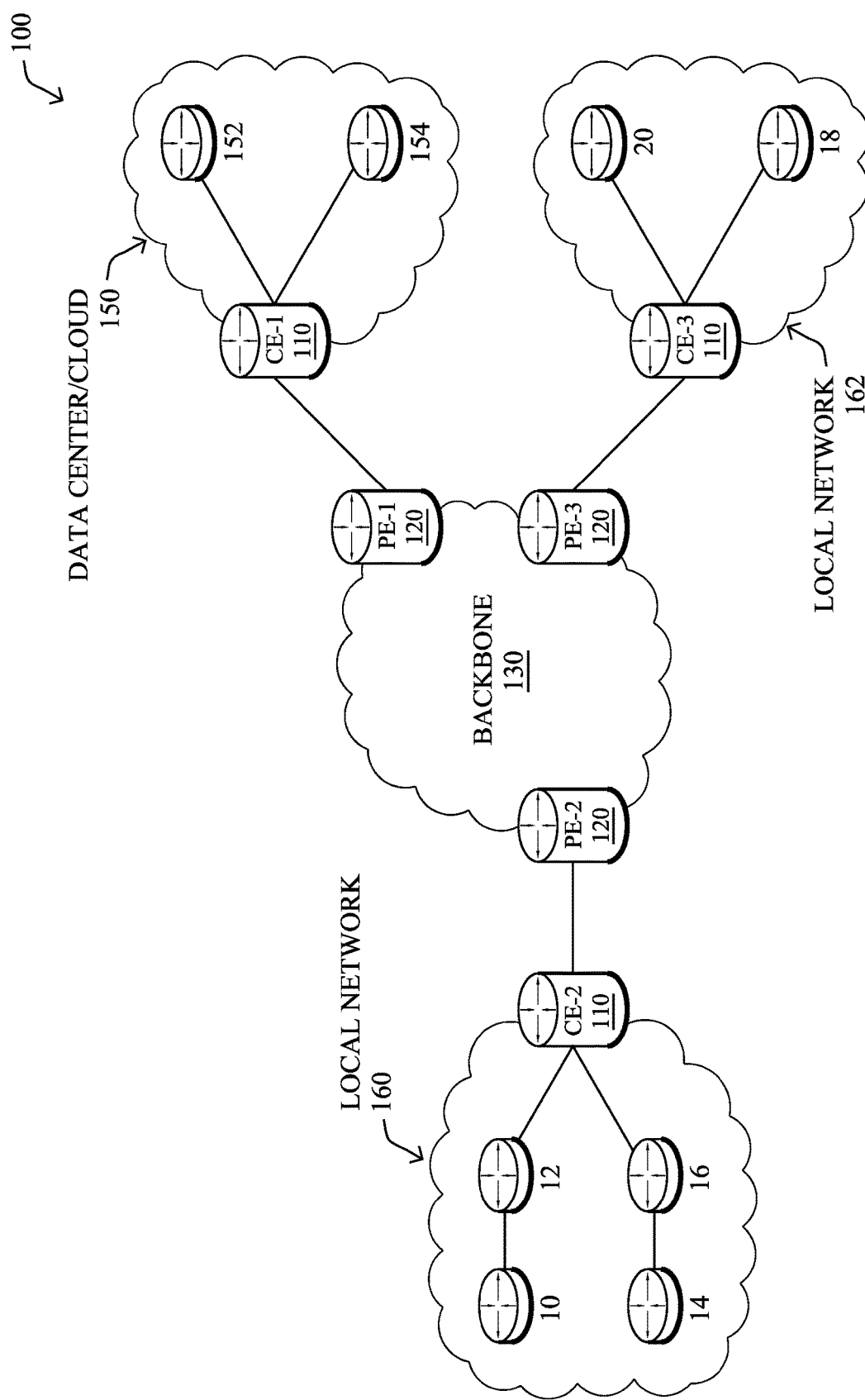

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
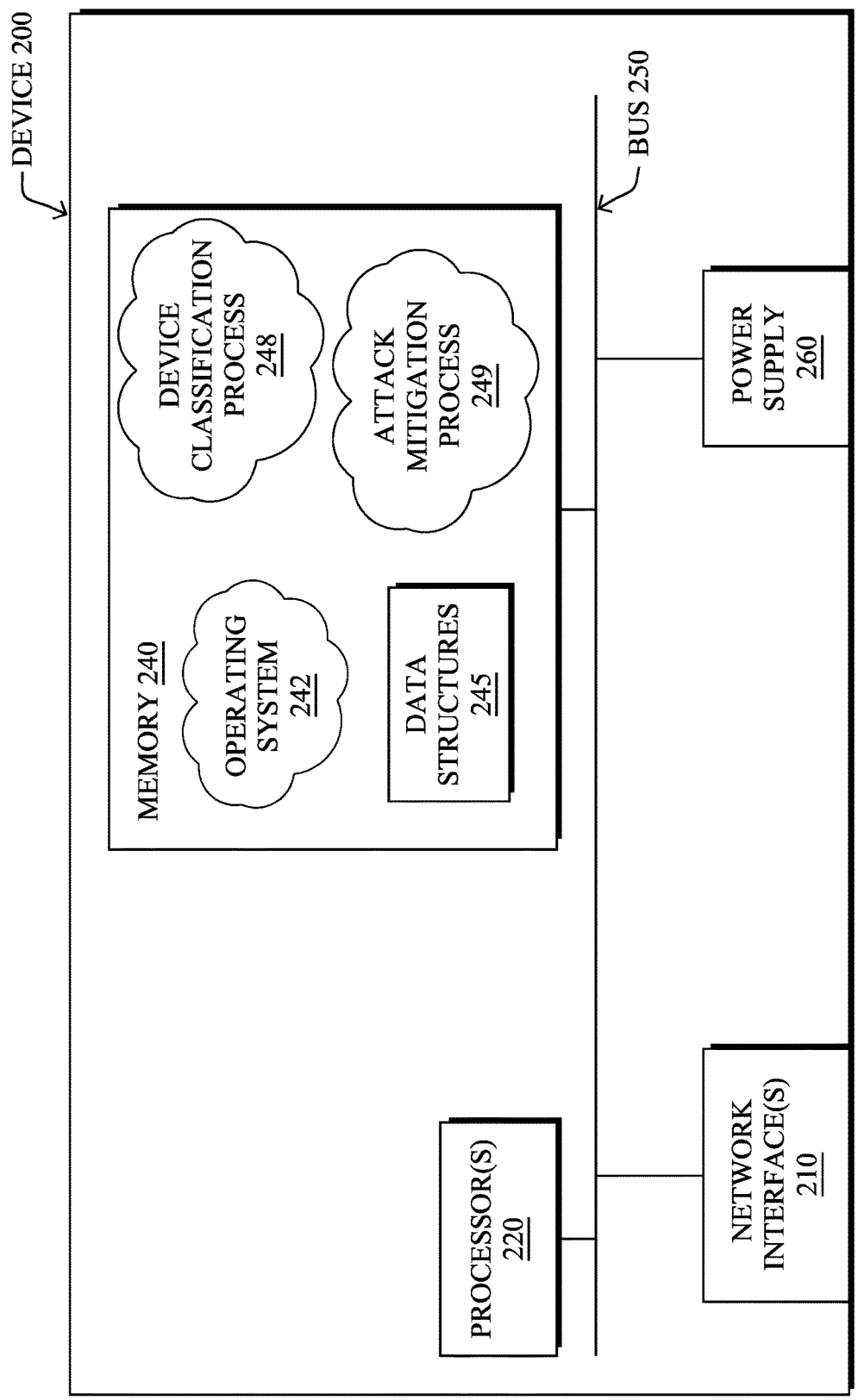
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
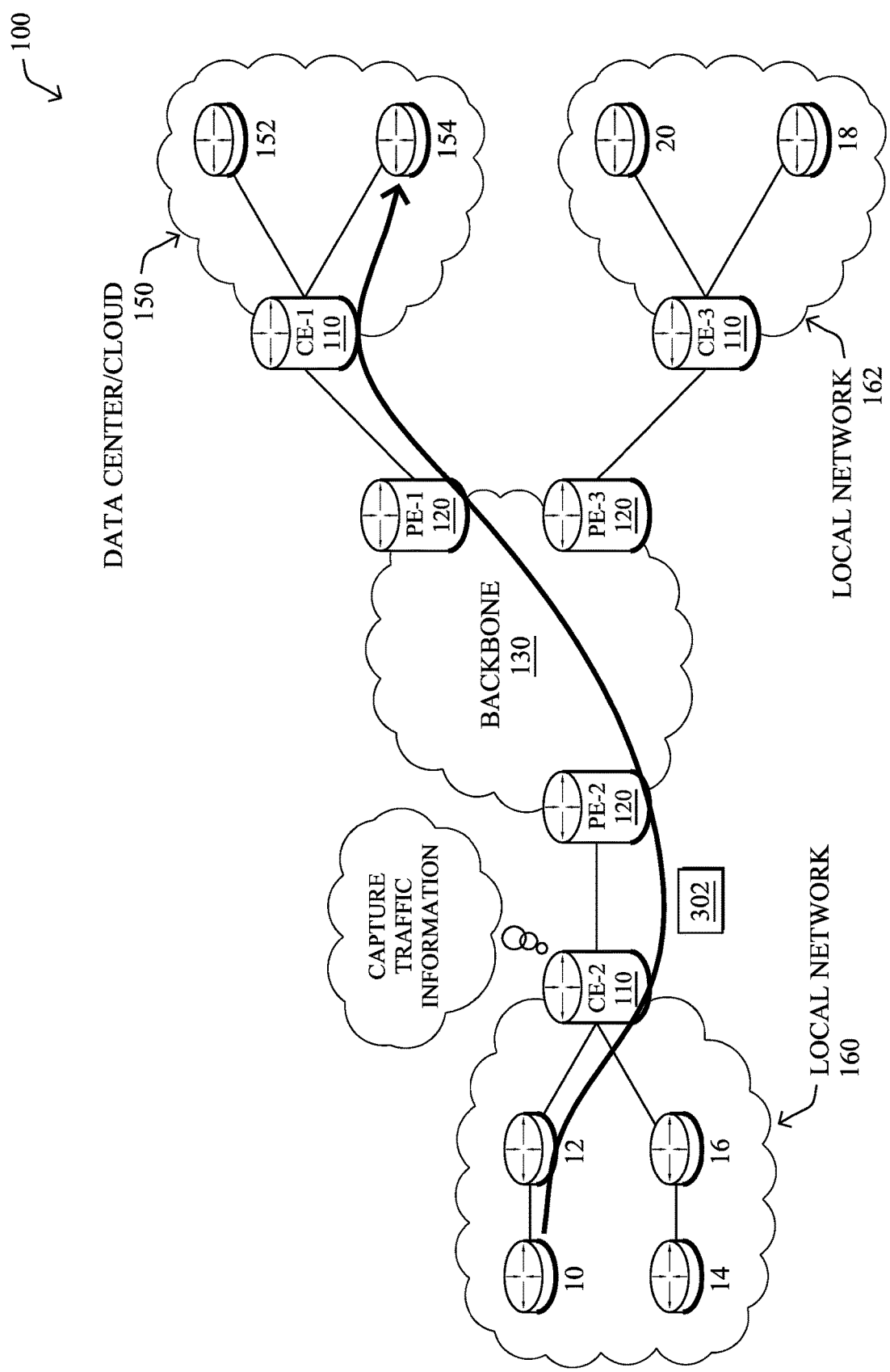
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
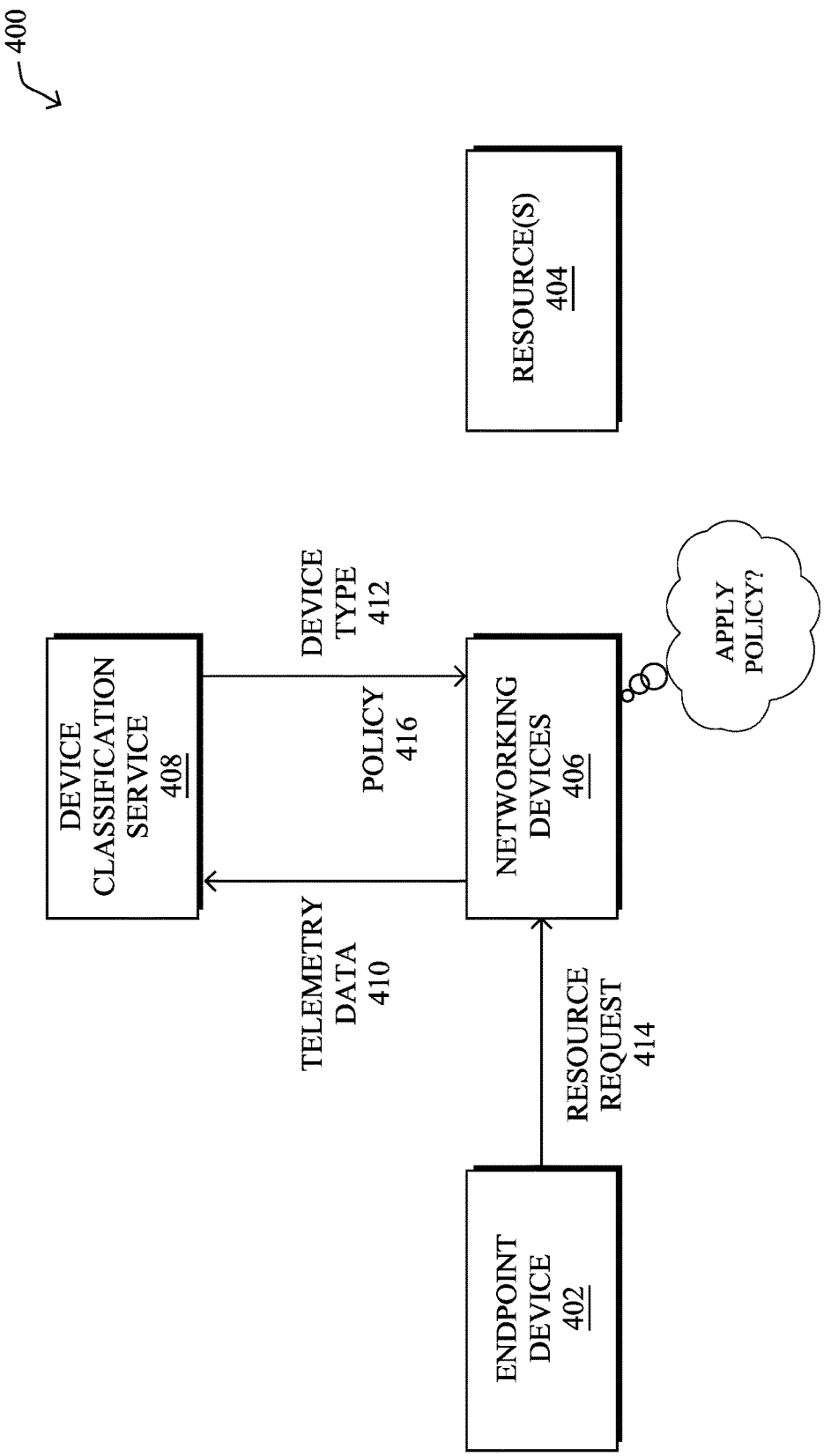
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that comprises one or more servers or other devices, such as networking devices 406, or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
Switch Port Analyzer (SPAN) probes, to get messages in INIT-REBOOT and SELECTING states, use of Address Resolution Protocol (ARP) cache for IP/MAC binding, etc.
Netflow probes
HyperText Transfer Protocol (HTTP) probes to obtain information such as the OS of the device, Web browser information, etc.
Remote Authentication Dial-In User Services (RADIUS) probes
Simple Network Management Protocol (SNMP) to retrieve management information base (MIB) object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
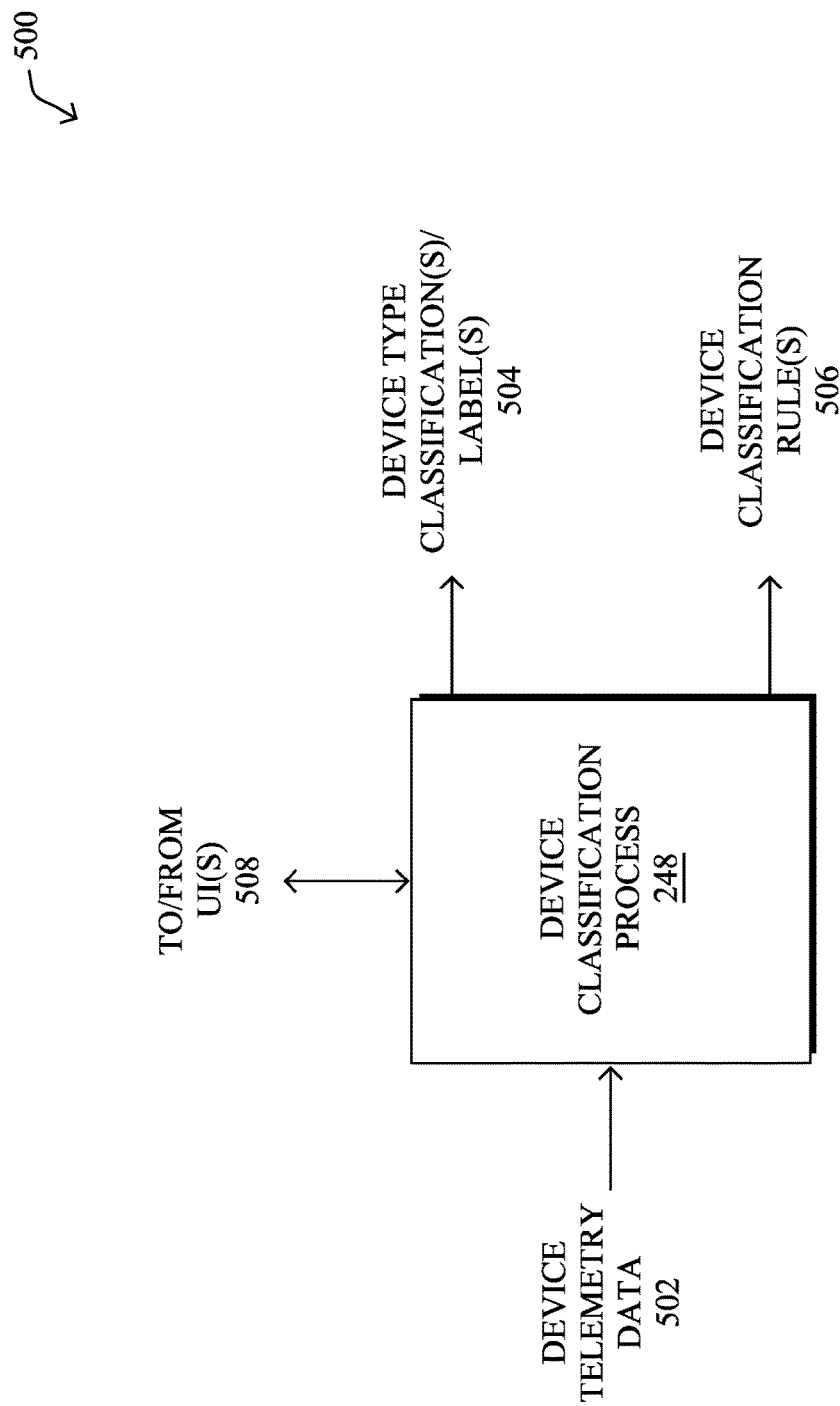
FIG. 5 illustrates an example of the operation of a device classification process.

FIG. 5 illustrates an example 500 of the operation of device classification process 248, according to various embodiments, which can be executed to provide a device classification service to a network (e.g., service 408 shown in FIG. 4, etc.). As shown, device classification process 248 may receive device telemetry data 502 regarding any number of devices undergoing device type classification. Such device telemetry data 502 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 502 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 504 for a device under scrutiny, thereby allowing the receiving entity to apply network policies to the device, based on its device type classification(s)/label(s) 504. For example, one such network policy may cause a networking device to prevent an MRI machine from accessing the Internet or another resource via the network.

In some embodiments, device classification process 248 may leverage active learning, to assign device type classification(s)/label(s) 504 to the devices under scrutiny. To do so, device classification process 248 may send a request to one or more user interfaces (UIs) 508, asking one or more human experts to label any devices that process 248 cannot label and/or verify the labeling by process 248. In this way, device classification process 248 can learn the labels of unknown devices over time and improve its device labeling.

Note also that the pool of device telemetry data 502 may be from any number of networks and that device classification process 248 may also leverage label information received from any number of experts across any number of networks, as well.

In various embodiments, device classification process 248 may also label a device periodically, at a predefined time, or in response to a request to do so. For example, as the device under scrutiny uses the network, additional device telemetry data 502 can be captured. Generally speaking, the more device telemetry data 502 regarding a device, the greater the accuracy of its resulting device type classification/label 504. Indeed, there may be slight behavioral differences between devices of different types, leading device classification process 248 to misclassify the device, initially, but correct this misclassification later on in time, as more information about the device becomes available.

According to various embodiments, device classification process 248 may also be configured to generate a device classification rule 506 that summarizes its reasoning regarding a particular device type label 504. For example, in the case in which device classification process 248 labels devices by clustering the devices by their associated telemetry data 502 and applying labels to the different clusters, such a rule 506 can be synthesized by using the values of the centroid of that cluster, based on an average of the cluster, or the like.

By generating a device classification rule 506, the rule can be used either locally or on another device, to quickly assess the device telemetry data 502 for new devices on the network(s). This allows every new device appearing on the network and matching device classification rule 506 to be identified with the corresponding device type label 504.

As noted above, device type classification relies on device telemetry data obtained about the device in the network. Typically, the device attributes included in the device telemetry data that is captured about the device fall into one of two categories:

1. Declarative attributes—this type of data is specified by the device itself, such as in the case of telemetry obtained via network probing, either directly from the networking device or indirectly (e.g., from a networking element connected to the device).
2. Behavioral attributes—this type of data relates to how the device itself actually performs on the network, such as its location and/or movement in the network, the applications that the device uses, its application usage profiles, the source/destinations of its traffic (e.g., addresses, ports, etc.), etc.

This gives rise to the potential for a malicious actor to infiltrate the network by means of a device that mimics the declarative attributes of another type of device. Such a device could spoof any type of attributes so as to trick the classification system into labeling it as a specific type of device. For instance, an attacker can spoof the MAC address of the device, using that of an existing device on the network. This can be used if the network uses 802.1X but has set up MAC Authentication Bypass for specific endpoints that do not support 802.1X. Based on the organizationally unique identifier (OUI) visible to the classification service, as well as potentially other probes spoofed by the device, the classification based on declarative information may still be unchanged.

In another example, an attacker can also spoof other probes, such as sending incorrect discovery probes (e.g., Cisco Discovery Protocol probes), altering the DHCP vendor class identifier exposed by the DHCP client, providing incorrect information via a Manufacturers Usage Description (MUD), or the like. For instance, the following command issued on a Linus computer can lead the computer being classified as a Cisco IP Phone 6921:
cdp -v -i ens160 -m 1 -D "Cisco" -L "Cisco IP Phone 6921" -P "666" -S "Cisco IOS" -F "10.10.10.1" -C S.

Detecting Spoofing in Device Classification Systems

The techniques herein introduce a machine learning-based approach to detect and blacklist devices exhibiting various forms of device type spoofing. In some aspects, the techniques herein leverage two fundamentally different sources of information, declarative and behavioral ones, both at any given point in time and across longer time spans. In further aspects, the techniques herein provide a mechanism by which false positives (i.e., incorrectly blacklisted devices) are learned to be filtered out over time. In further aspects, the techniques herein model the relationships between declarative and behavioral device attributes, without requiring the use of any pre-existing labels.

Specifically, according to various embodiments herein, a device classification service obtains device telemetry data indicative of declarative attributes of a device in a network and indicative of behavioral attributes of that device. The device classification service labels the device with a device type, based on the device telemetry data. The device classification service detects device type spoofing exhibited by the device using a model that models a relationship between the declarative attributes and the behavioral attributes. The device classification service initiates, based on the device type spoofing, a mitigation action regarding the device.

Illustratively, the techniques described herein may be performed by hardware, software, and/or firmware, such as in accordance with device classification process 248, which may include computer executable instructions executed by the processor 220 (or independent processor of interfaces 210) to perform functions relating to the techniques described herein.

Figure 6:
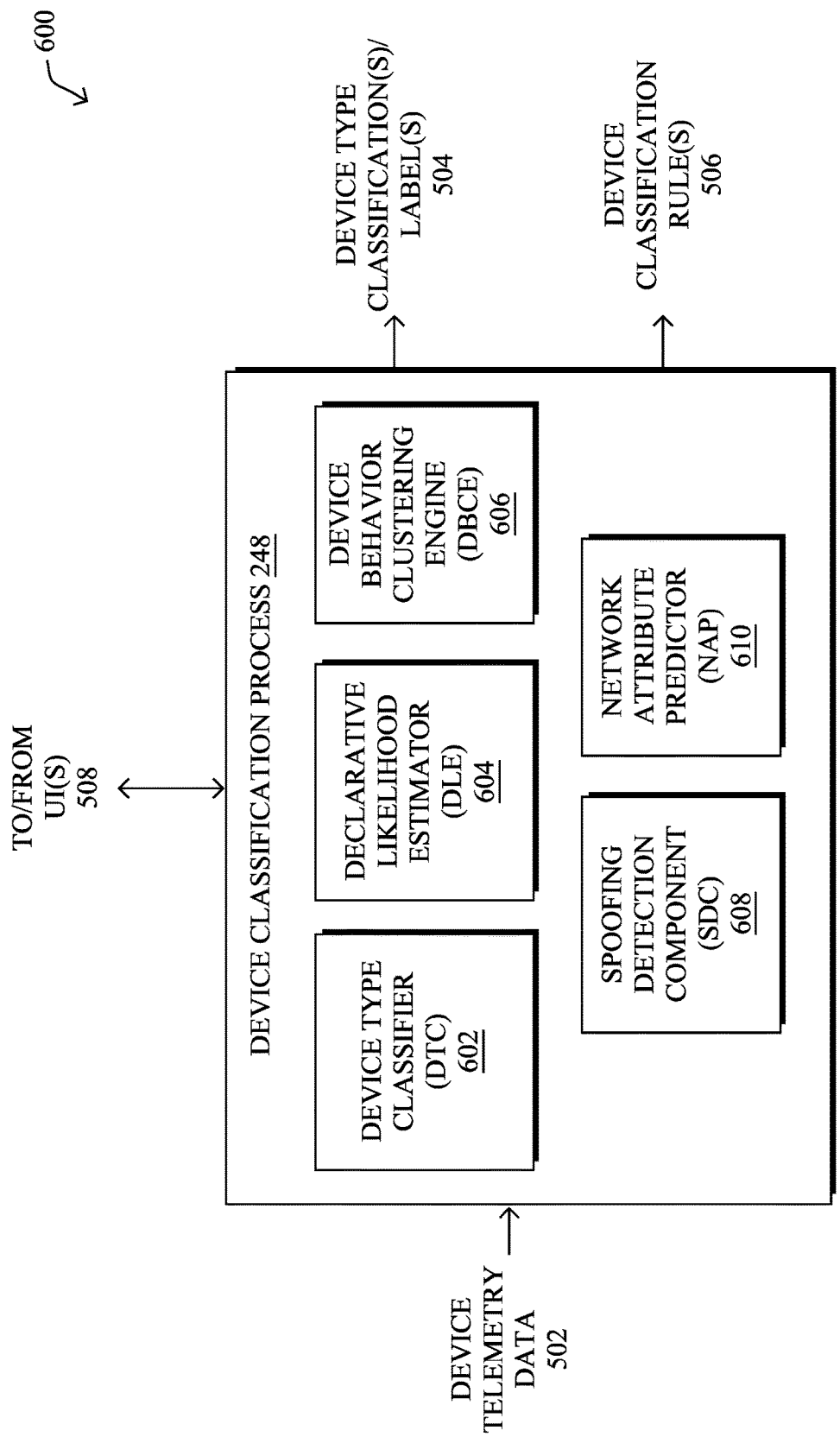
FIG. 6 illustrates an example architecture for detecting device type spoofing.

Operationally, FIG. 6 illustrates an example architecture 600 implementing the techniques herein, according to various embodiments. As shown, device classification process 248 may include any or all of the following components: a device type classifier (DTC) 602, a declarative likelihood estimator (DLE) 604, a device behavior clustering engine (DBCE) 606, a spoofing detection component (SDC) 608, and/or a network attribute predictor (NAP) 610. These components 602-610 may be implemented in a distributed manner or implemented on a single device. In addition, some or all of components 602-610 may be implemented as part of a monitored network (e.g., at the network edge, embedded deeper into the network, etc.) or part of a cloud-based device classification service. For example, in some implementations, a cloud-based device classification service may perform centralized rule generation for any number of networks that perform the classifications locally. The functionalities of the components of architecture 600 may also be combined, omitted, or implemented as part of other processes, as desired.

The techniques herein introduce multiple layers of defense against device type spoofing: 1.) predicting device type classifications based on behavioral attributes of a device, even if the main classification of the device does not rely on this data, 2.) verifying declarative attributes of the device based on its behavioral attributes, and/or 3.) performing coarse modeling of the behaviors using clustering.

To better illustrate the techniques herein, first assume that the device telemetry data 502 includes two types of attributes of a device in a network: declarative attributes and behavioral attributes. Such attributes can be used to build two different feature vectors for a given device D in the network: 1.) declarative attributes vector $X_d$, which can be easily spoofed by the device and are typically used for device classification, and 2.) behavioral attributes vector $X_b$, such as the applications used by D, its location and movement in the network, application usage profiles, and the source and destination of flows. Device classification process 248 can store these two feature vectors in two datasets for the device D.

In some embodiments, device classification process 248 may divide the two different types of device attributes in device telemetry data 502 into two different training datasets for training a machine learning model. More specifically, assume that process 248 is to apply a device type label L to a given device D. In such a case, the training datasets can include pairs $(X_d^D, L^D)$ and $(X_b^D, L^D)$, respectively.

As shown, device classification process 248 may include device type classifier (DTC) 602 which is configured to label a device with a device type label 504 based on its associated device telemetry data 502. In some cases, the main classification of the device may be based entirely on its declarative attributes or, alternatively, on a combination of its declarative and behavioral attributes. For example, the classification may cluster the device attributes, to assign the device to a labeled cluster, or leverage a trained machine learning classifier. In other cases, the main classification can be performed using a set of predefined classification rules.

To protect against device type spoofing by the device under scrutiny, DTC 602 may construct a multi-class classifier $M_C$ trained on $X_b$ and L. This classifier may take the form of tree-based models (e.g., Random Forest or Gradient Boosting Trees), Support Vector Machines (SVMs), or Deep Neural Networks (DNNs), in various embodiments, without loss of generality. The expectation is that one can accurately predict the type of a given device given a rich enough description of its behavior. The classifier can leverage features built on behavioral attributes computed over medium to long time intervals as well, when required (e.g., using aggregation windows of the order of minutes to hours). When this model is accurate on a given class of devices, DTC 602 may push this model to spoofing detection component (SDC) 608, described below, which uses the model to detect situations wherein a given device D, recognized as type X by device classification process 248, is not assigned this label by the classifier $M_C$.

It should be noted that the prediction model computed by DTC 602 and used by SDC 608 may differ from the classifier used to assign a device type classification/label 504 to a given device. Indeed, in some cases, DTC 602 may be responsible for both the main classification of a device, as well as the generation of the classifier for SDC 608. However, in other embodiments, the main classification may be performed separately (e.g., by an ISE, etc.) and components 602-610 may operate to ensure that the classification is not affected by device type spoofing.

Figure 7:
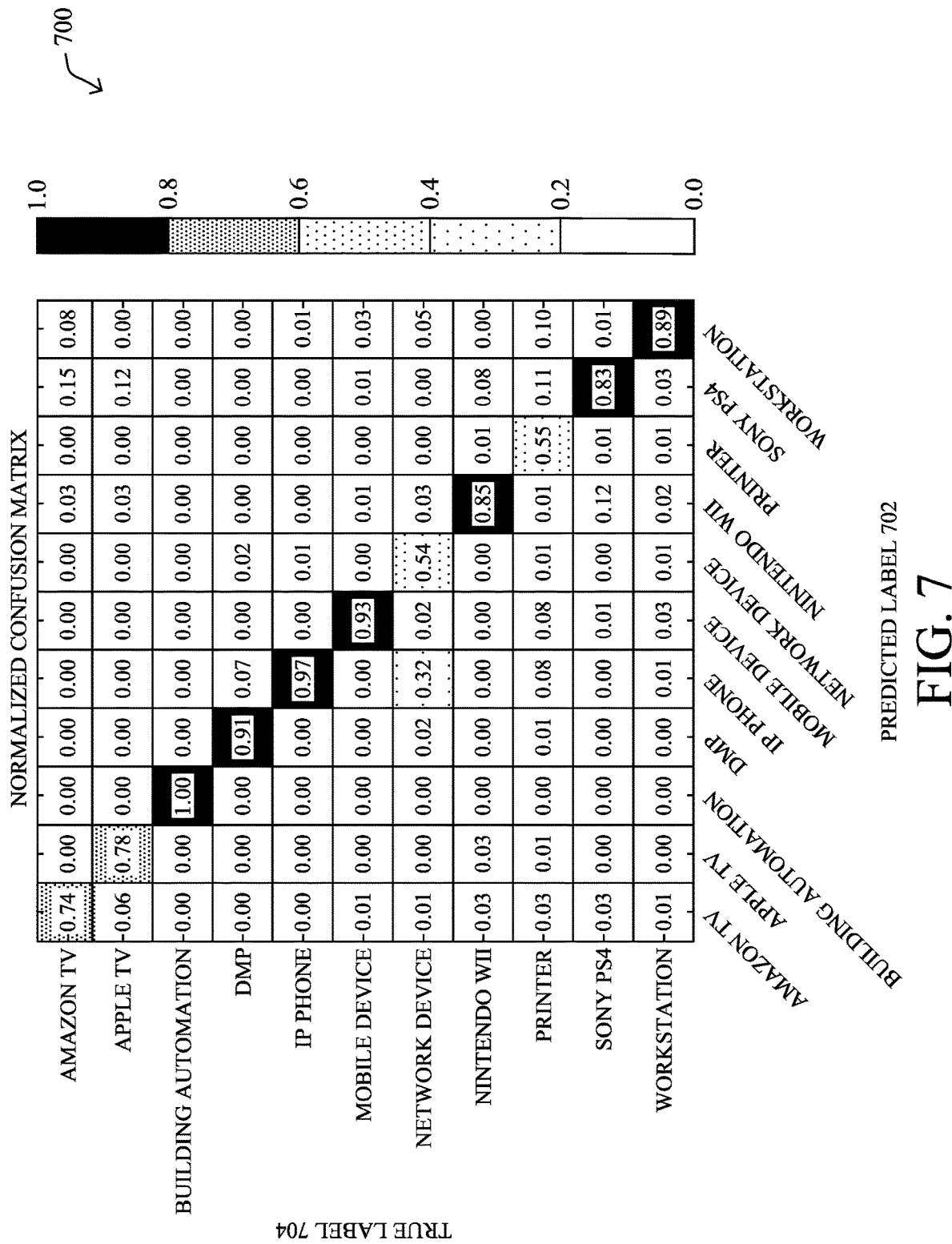
FIG. 7 illustrates an example confusion matrix.

FIG. 7 illustrates an example confusion matrix 700 for various device types, according to various embodiments. To demonstrate the efficacy of the techniques herein, prototype classifiers were trained using device telemetry data captured in a real network. More specifically, logistic regression classifiers were trained for each class in a one-versus-rest fashion using the following device type labels:

AmazonTV

AppleTV

Building Automation

DMP

IP Phone

Mobile Device

Network Device

Nintendo Wii

Printer

Sony PS4

Workstation

As shown, the columns of confusion matrix 700 represent the device type labels 702 predicted by the classifiers for various devices, while the rows of confusion matrix 700 represent the true/actual labels 704 of those devices. Accordingly, an entry at row i and column j indicates the fraction of traffic samples from class i that are classified on a testing set (e.g., endpoints and traffic held out during training) as being of class j. An ideal classification would achieve ones along the diagonal of confusion matrix 700 and zeroes on off-diagonal entries. Non-zero, off-diagonal entries in confusion matrix 700 indicate confusion between certain classes Apple TV are often confused with Amazon TV or Sony PS4 endpoints). Although these results are based on a relatively small amount of data: device telemetry data regarding approximately 70,000 endpoints collected for one month, they demonstrate that the approach proposed herein demonstrates good detection abilities.

Figure 8A:
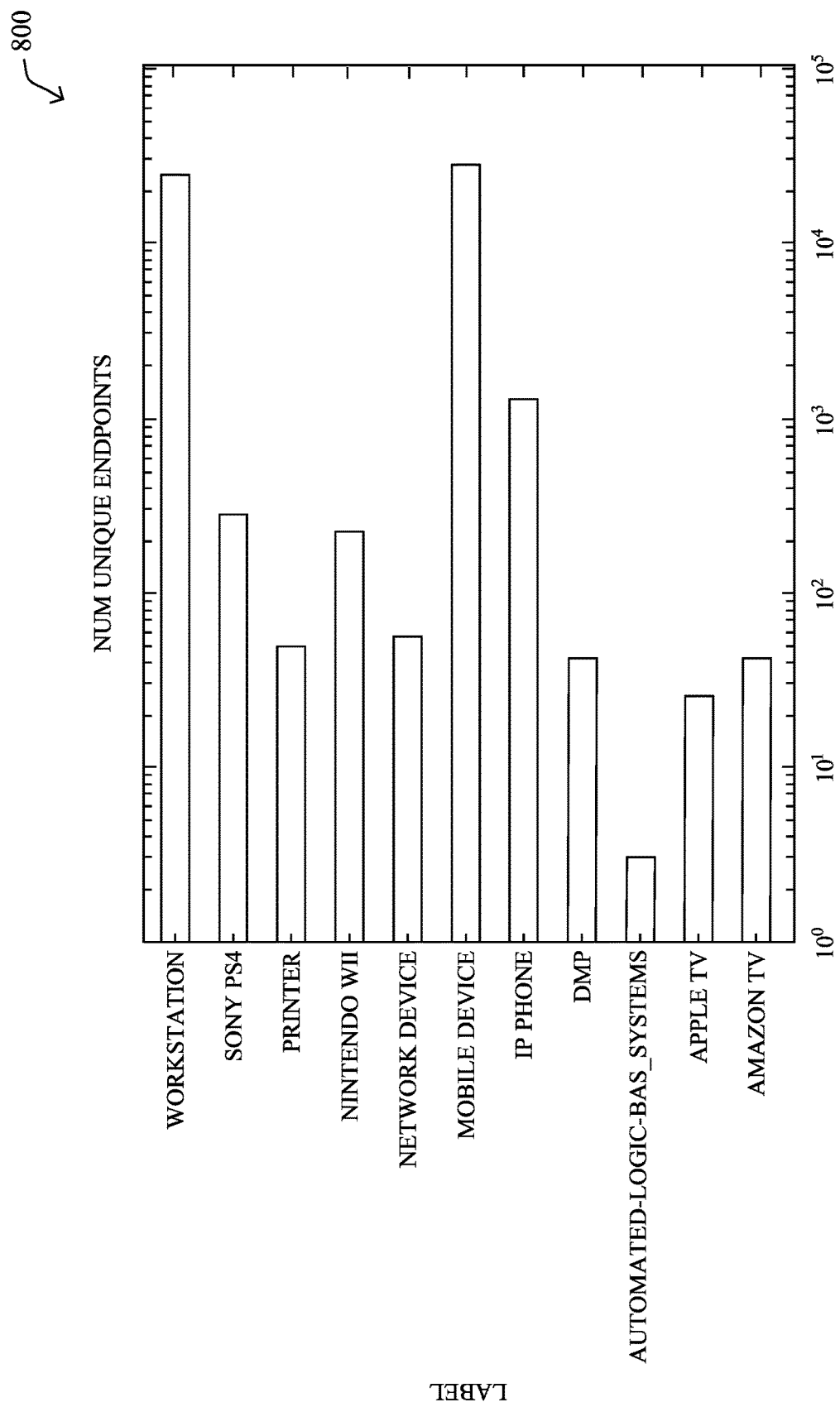
FIGS. 8A-8B illustrate example plots of various device types.
Figure 8B:
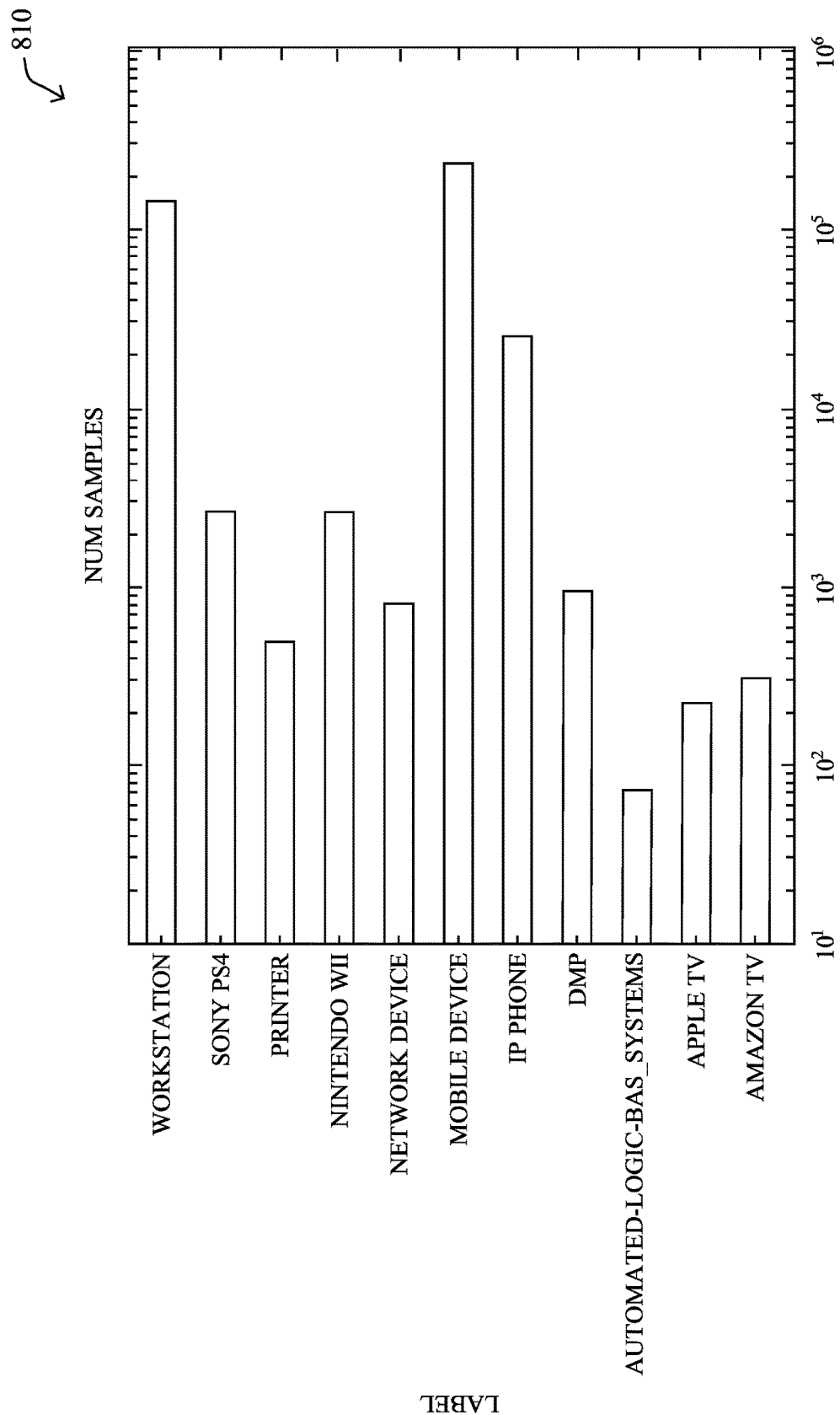

FIGS. 8A-8B illustrate example plots of various device types, according to various embodiments. As shown in FIG. 8A, plot 800 shows the device type labels of FIG. 8 plotted against the number of unique endpoints in the pool of test data used for the prototype. Likewise, plot 810 in FIG. 8B shows the number of samples captured per device type for the prototype system. Naturally, the device types with a larger number of endpoints also have a larger number of samples. However, from confusion matrix 700 in FIG. 7, the system was able to learn good models for all of the device type classes, even those with a limited number of endpoints. For example, only four building automation endpoints (e.g., Automated-Logic-BAS_Systems) were observed, and from two different vendors, but the prototype system was able to learn a very precise model of this specific device type, nonetheless.

Referring again to FIG. 6, another component of device classification process 248 may be declarative likelihood estimator (DLE) 604, which builds a model for $P(X_d|X_b)$, i.e., the probability/likelihood of a device exhibiting $X_d$ given $X_b$ being observed. In some embodiments, DLE 604 may build such a model as a DNN, to model this probability/likelihood. Note that most declarative attributes tend to be categorical and, often, strings.

In one embodiment, the modeling problem of DLE 604 can be expressed in a Naïve-Bayes fashion as that of learning a language model from the field of Natural Language Processing (NLP) for each attribute, individually. This creates a model of the form:

$$P(X_d|X_b)=P(X_{d,1}|X_b) \ldots P(X_{d,K}|X_b)$$

where K denotes the total number of attributes. Techniques such as Noise Contrastive Estimation (NCE) can be used if the vocabulary is large for a given attribute. In addition, if a given attribute corresponds to a somewhat structured string (e.g., an HTTP user agent), the probability can be further factored over individual tokens in the string as is done in Neural Machine Translation and similar problems.

In another embodiment, DLE 604 may model and train a join conditional likelihood function directly using the appropriate DNN architecture. For example, DLE 604 could compute the log-likelihood over samples from the datasets, as well as negative samples that can be generated by corrupting real samples. Such corrupted samples can be used as the 'noise' distribution in NCE, for instance, by swapping attributes or perturbating/generating them at random.

DLE 604 may also be responsible for training those models regularly, in order to keep adapting to the traffic and device patterns seen in the network. Training and testing datasets can be split by taking time into account, as is done for back-testing time series algorithms. More specifically, DLE 604 can train the model on data from [t−T−c, t−T] and test the model using data from time period [t−T, t]. When the result of this training and testing leads to an acceptable level of model performance (e.g., accuracy above a defined threshold, etc.), DLE 604 may push the resulting model to SDC 608.

A further potential component of device classification process 248 may be device behavior clustering engine (DBCE) 606, which applies clustering to the behavioral attributes of devices, to group the devices into device clusters, in some embodiments. DBCE 606 may update this clustering regularly, based on new device telemetry data 502, while maintaining the identities of the clusters. DBCE 606 may do so, for example, using incremental methods such as incremental density-based spatial clustering of applications with noise (DBSCAN) or various forms of hierarchical clustering where the hierarchy is updated in-place as new feature vectors are observed and as new endpoints appear.

The rationale behind the layer of defense afforded by DBCE 606 is that general behaviors can be captured through the application of clustering. For instance, a cluster may consist of a certain kind of workstations, which would not be captured by DTC 602, which works at the finer granularity of device labels.

According to various embodiments, device classification process 248 may also include spoofing detection component (SDC) 608, which receives the machine learning models computed by DTC 602, DLE 604, and/or DBCE 606, described previously. This allows SDC 608 to implement a multi-layer defense against device type spoofing exhibited by an endpoint device. More specifically, for a given device. D seen on the network and classified/labeled as being of device type $L^D$, SDC 608 may perform any or all of the following:

Apply the classifier produced by DTC 602 to the feature vector $X_b^D$ and validates that the predicted class L* is indeed equal to $L^D$. In other words, SDC 608 may use the behavioral attributes of the device as input to a machine learning classifier, to predict a type label assigned to the device. In turn, SDC 608 may compare the predicted type label to the type label 504 assigned to the device by the main classification function of device classification process 248. SDC 608 can then flag any discrepancies as potential device type spoofing by the device.

Estimate $P(X_d|X_b)$ using the model from DLE 604, which should indicate if the declarative attributes of the device are indeed real. In other words, if there is a sufficiently low probability/likelihood (e.g., below a threshold) of the behavioral attributes of the device being seen with its set of declarative attributes, SDC 608 may determine that the device is exhibiting device type spoofing.

Continuously monitor the output of the model of DBCE 606, to see whether the device tends to alternate between different device clusters, based on its behavioral attributes. If so, this could also indicate device type spoofing and SDC 608 may flag the device as exhibiting device type spoofing.

If any of the three verifications reveal an anomaly, SDC 608 may initiate any number of corrective measures. In some embodiments, SDC 608 may send an alert to a UI 508 to alert a network operator or a member of the Security Operation Center (SOC), who can then assess and mitigate the issue. Note that, in this context, SDC 608 may leverage a wide range of model interpretability methods, in order to provide more information to the operators about the suspicious behavior. For instance, SDC 608 could use Shapley values on the classifier $M_C$ from DTC 602, to reveal which behavioral features in $X_b^D$ caused the model to yield a different prediction than $L^D$. Similarly, SDC 608 may use feature attribution techniques on the declarative attributes' likelihood, to reveal declarative attributes that are inconsistent with each other, typically because the spoofing is not perfect.

Operators may then reject alerts via UI(s) 508 that are deemed incorrect which, in turn, may be used by SDC 608 to adjust its thresholds and/or filtering strategies. Indeed, note that every model used by SDC 608 may output a score and these scores may be combined in order to make a decision about the likelihood of a spoofing device.

In further embodiments, SDC 608 may quarantine devices that are identified as potentially exhibiting device type spoofing, until a human operator could review the details. In this case, SDC 608 may configure network elements in the network of the device to 1.) block the corresponding device (e.g., by installing a firewall rule, etc.), or 2.) redirect the traffic of the device to a honeypot for inspection by the human operator.

According to various embodiments, device classification process 248 may include a network attribute predictor (NAP) 610, which takes as input the behavioral attributes $X_b$ for an endpoint device D and predicts its declarative attributes $X_d'$. To achieve this, NAP 610 may use a variety of models, the most suitable of which is based on the encoder-decoder architecture (EDA), such as an autoencoder.

Figure 9:
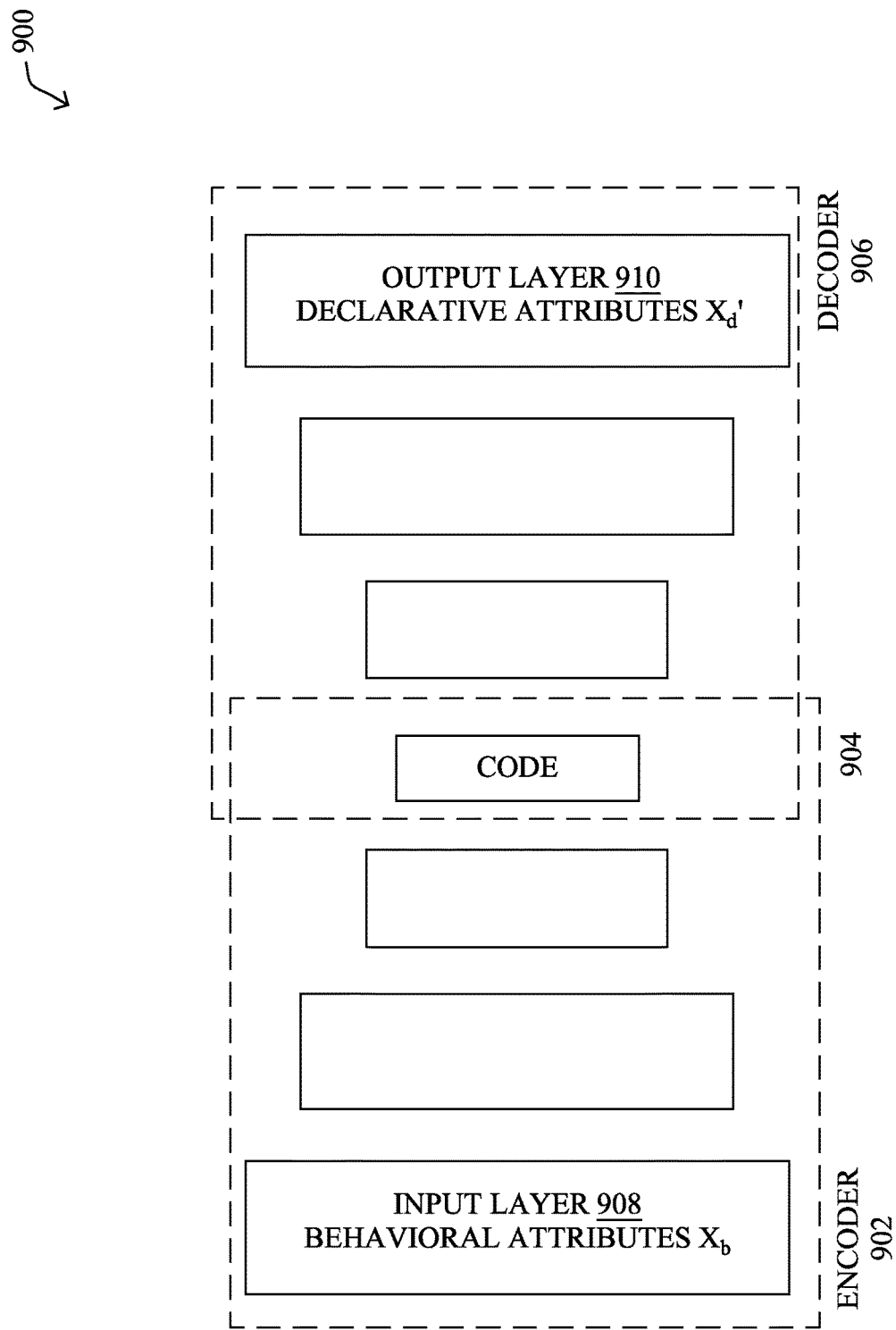
FIG. 9 illustrates an example autoencoder.

FIG. 9 illustrates an example autoencoder 900, in various embodiments. As shown, autoencoder 900 may comprise an encoder 902 having an input layer 908 that inputs the behavioral attributes feature vector $X_b$ for a device and a decoder 906 having an output layer that outputs the predicted declarative attributes $X_d'$ of that device.

As would be appreciated, autoencoder 900 may operate to learn a code 904, which is essentially a compact representation of the input feature vector, in terms of dimensionality, insofar that it captures the essential information to reconstruct another representation of the same entity. Oftentimes, this is used to learn an embedding in lower dimensionality of a given representation, in which case the input and output feature vectors are the same and the whole system is called an autoencoder.

In the present case, autoencoder 900 is trained to predict the declarative attributes from the behavioral attributes of an endpoint. In doing so, the predicted and observed declarative attributes can be compared. Any discrepancies can then be used to infer which of these attributes, if any, were spoofed by the endpoint (e.g., because they do not match the behavioral patterns of the endpoint).

Referring again to FIG. 6, NAP 610 may train its autoencoder using a large number of pairs $(X_b, X_d)$ collected from any number of networks over time. A variety of different architecture and training strategies can also be used, ranging from sparse autoencoders, whereby the internal code is encouraged to be as sparse as possible, to denoising autoencoders, whereby the input is corrupted randomly in order to improve robustness of the reconstruction. In further cases, NAP 610 may train variational autoencoders, which are generative models based on graphical models.

In further embodiments, NAP 610 could make use of two or three networks in parallel, which are co-trained with a contrastive or triplet loss, similarly to what is done in twin neural networks. In this specific embodiment (which, importantly, is conceptually similar to that of the auto-encoder), networks would be trained on either pair of similar or dissimilar feature vectors or, in the case of the triplet loss, on both a triplet of (anchor, positive, negative) feature vectors.

Figure 10A:
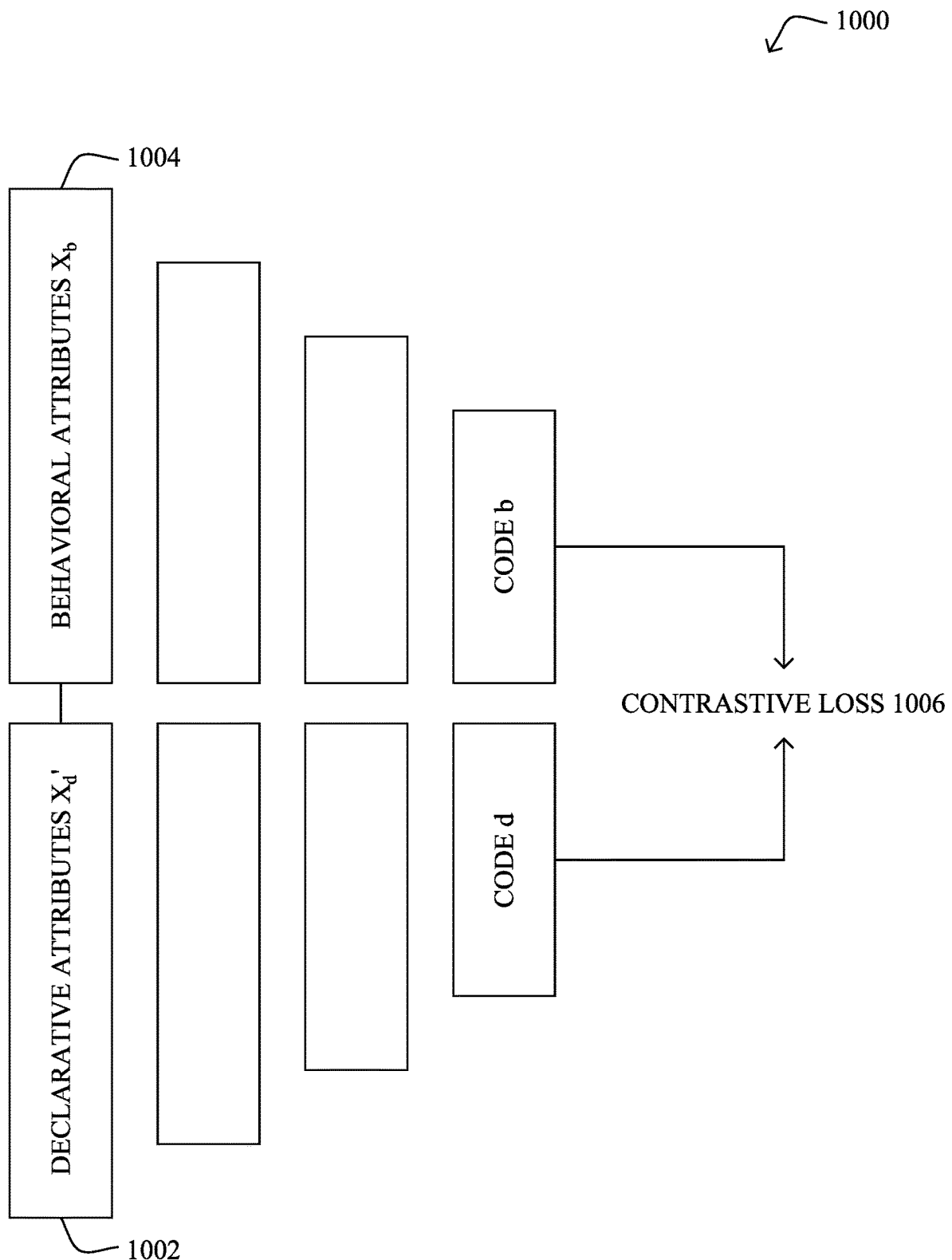
FIGS. 10A-10B illustrate example parallel encoder models.
Figure 10B:
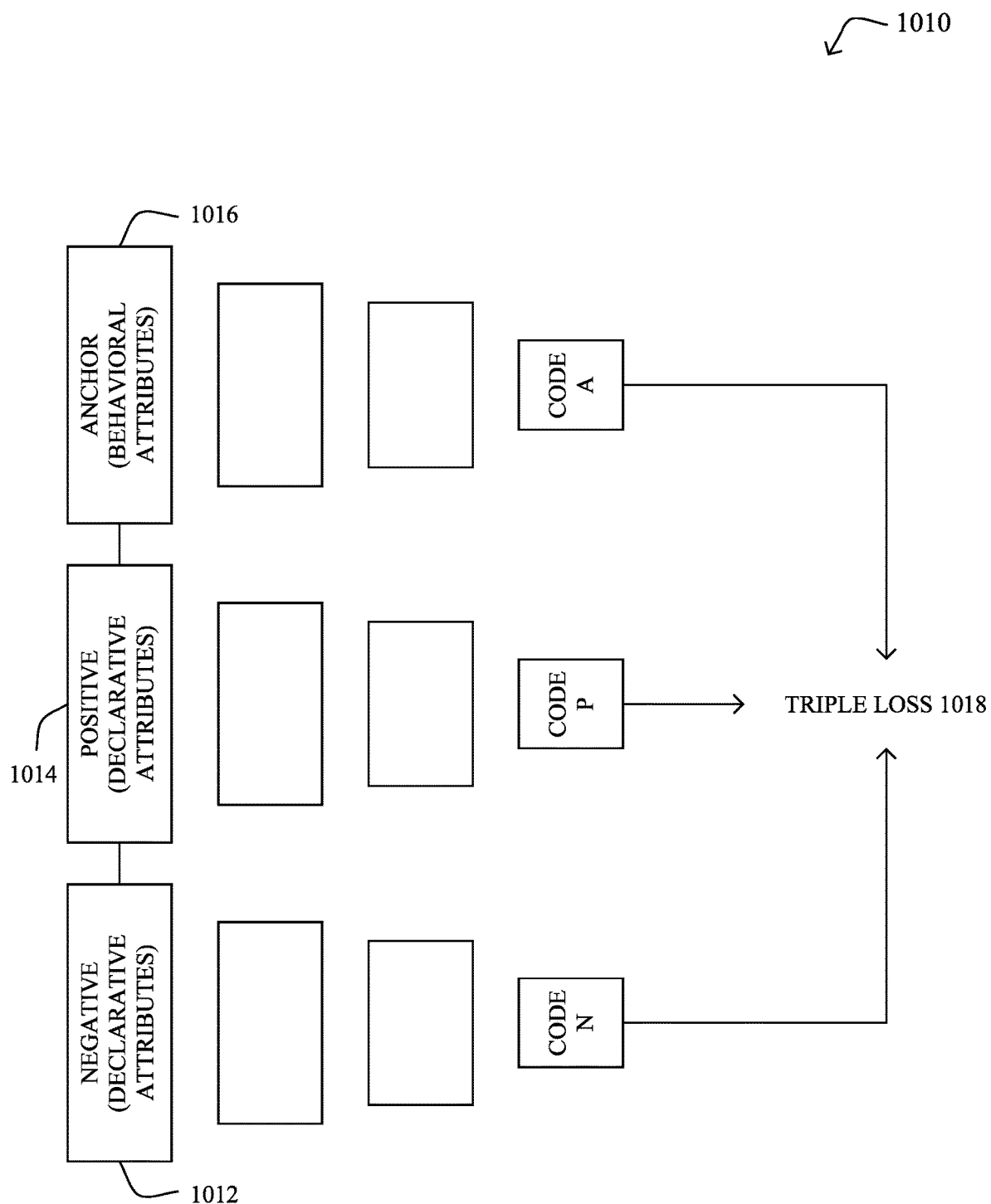

FIGS. 10A-10B illustrate example parallel encoder models that NAP 610 may use, in various embodiments. As shown in FIG. 10A, model 1000 may have parallel input layers 1002 and 1004, inputting $X_b$ and $X_d'$ in parallel, and the resulting codes can be compared, to determine a contrastive loss 1006. Alternatively, as shown in FIG. 10B, model 1010 may have three input layers 1012-1016, inputting negative and positive examples of the declarative attributes, and using the behavioral attributes as an anchor, respectively. As a result of this parallel training, the resulting codes can be compared, to compute a triplet loss 1018.

Referring yet again to FIG. 6, SDC 608 may make use of the encoder-decoder model produced by NAP 610, to detect device type spoofing by an endpoint device. To do so, SDC 608 may use the behavioral feature vector $X_b$ for the device as input to the model from NAP 610. This vector is then encoded and decoded using the model, thus producing a set of predicted network attributes $X_d'$, which SDC 608 compares to the actual attributes of the endpoint device. When a discrepancy is detected by SDC 608 between the predicted and actual value of an attribute A, SDC 608 may flag that attribute as potentially having been spoofed by the device.

Typically, an attacker will spoof more than one attribute in order to reliably fool or confuse the classification service. For instance, in order to spoof a Cisco 1P Phone, an advanced attacker may spoof the following attributes:

CDP
LLDP
DHCP vendor class identifier
DHCP fingerprint
User-Agent
OUI

As a result, SDC 608 may build up some more confidence in its detection of an attack by the number of attributes that are conflicting. By using a variational model, SDC 608 may also evaluate directly the posterior distribution of the output, thus allowing for a more fine-grained estimation of the likelihood of an attack (and its confidence).

Note that this approach does not strictly require a classification stage, whereby the device is first classified based on its device telemetry data 502 and the results compared to a predicted device type label using a classifier that assesses the behavioral attributes of the device, as described previously with respect to model $M_C$ trained by DTC 602. In that case, the classifiers are trained for each class/type of device using a set of behavioral attributes. Then, when a device D is classified as of type T then the classifier trained to recognize the behavior of class T may be called by SDC 608 to check whether the device indeed behaves as a device of type T. A potential issue, though, is when the device cannot be classified, or the classification is incorrect. This can be avoided using the encoder-decoder based approach of NAP 610.

In some embodiments, the encoder portion of the model trained by NAP 610 can be deployed for execution by a networking element in the network, such as to the edge of the network. This allows the networking element to use the encoder to generate a compressed representation of the behavioral attributes of the device for inclusion in the device telemetry data 502 to be sent to the device classification service. Indeed, by separating the encoder from the decoder, the network element itself may perform the feature construction and the encoding of the feature vectors, locally, thus saving the precious WAN bandwidth between branch offices and the service. Then, the very compact codes are sent to the service to be decoded into a predicted vector of network attributes, which can be used by the service for spoofing detection.

Another advantage of this approach is also that the code produced by the encoder is typically very difficult to revert to the original representation, thus allowing it to protect the privacy of the source network. Perturbations could even be introduced that would make the whole system differentially private, while still retaining the ability to detect relevant spoofing attempts. This would be particularly useful in case where the spoofing detection is performed in the cloud.

In another embodiment the coder generated by NAP 610 may be adjusted to the set of behavioral features available on the edge device potentially leading to multiple coder-decoder approaches. A feedback loop could also be used to adjust the false positive and/or false negative rate of the encoder-decoder using input for a third-party system or expert. For example, when SDC 608 detects a "mismatch" between predated and observed attributes (e.g., a spoofing attack), feedback provided by a third-party system or a user via a UT 508, could be used by NAP 610 to re-adjust the coder-decoder model, dynamically.

Optionally, on receiving the code for a given endpoint (e.g., from an edge-located encoder) or computing the code from raw telemetry data 502, SDC 608 may then sample many candidate attributes from the posterior distribution predicted by the model. The resulting samples can then be used as context for the end user via UI 508, to show examples of expected probes for this class of behavior.

In further embodiments, the mechanisms of NAP 610 can be integrated into the multi-stage protections afforded by DTC 602, DLE 604, and DBCE 606. For example, SDC 608 may use the models trained by DTC 602, DLE 604, and/or DBCE 606 to detect spoofing by a device whose classification is well known, and the model from NAP 610, when the device cannot be classified by the main classifier and labeled as 'UNKNOWN.'

Figure 11:
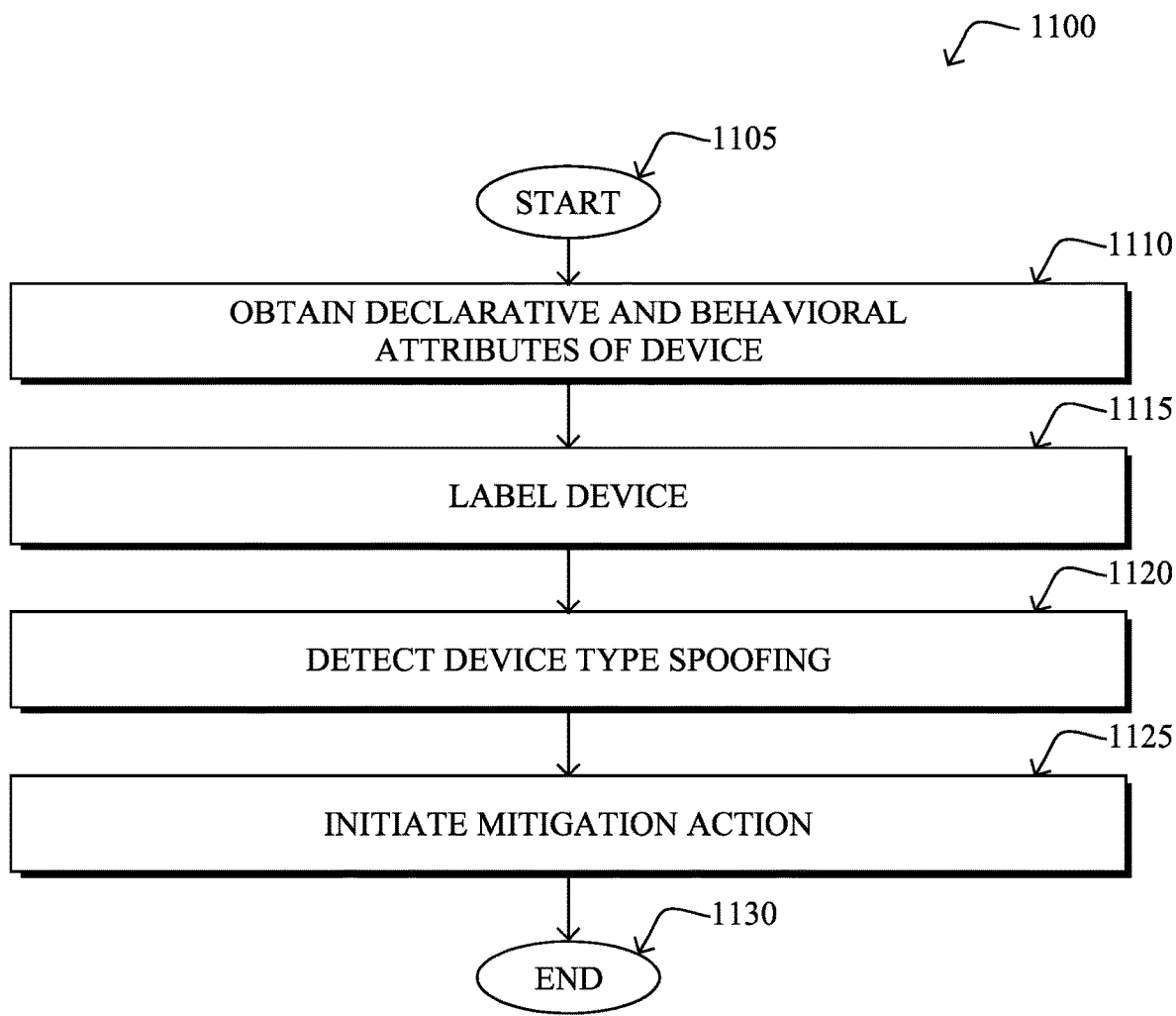
FIG. 11 illustrates an example simplified procedure for detecting spoofing in device classification systems.

FIG. 11 illustrates an example simplified procedure for detecting spoofing in device classification systems, in accordance with one or more embodiments described herein. For example, a non-generic, specifically configured apparatus (e.g., device 200) may perform procedure 1100 by executing stored instructions (e.g., process 248), to provide a device classification service to one or more networks. The procedure 1100 may start at step 1105, and continues to step 1110, where, as described in greater detail above, the device classification may obtain device telemetry data indicative of declarative attributes of a device in a network and indicative of behavioral attributes of that device. In various embodiments, the declarative attributes may comprise one or more attributes asserted by the device during a network probe of the device. Conversely, the behavioral attributes may comprise one or more attributes indicative of a location of the device in the network, the applications that it uses, its application usage patterns, or the like.

At step 1115, as detailed above, the service may label the device with a device type, based on the device telemetry data. In some embodiments, the service may do so using predefined device type classification rules. In further embodiments, the service may do so using a machine learning model, such as by using the attributes of the device to assign the device to a device cluster and labeling the device with a device type label associated with that cluster. In some embodiments, the service may use the declarative attributes of the device to assign a type label to the device and may, or may not, rely on any of the behavioral attributes from the device telemetry data.

At step 1120, the service may detect device type spoofing exhibited by the device using a model that models a relationship between the declarative attributes and the behavioral attributes, as described in greater detail above. In some embodiments, the relationship between the declarative attributes and the behavioral attributes may take the form of a probability of the declarative attributes given the behavioral attributes. In a further embodiment, the model may comprise a joint conditional likelihood function trained using a neural network. In yet another embodiment, the model may include an encoder that takes the behavioral attributes as input and outputs declarative attributes (e.g., predicted). This allows for the detection of spoofing by comparing the output declarative attributes to those in the device telemetry data observed for the device. In further embodiments, the service may detect spoofing by applying clustering to the behavioral attributes of the device, to assign the device to one or more device clusters over time, and then detecting when the device alternates between assigned device clusters.

At step 1125, as detailed above and based on the detected device type spoofing, the service may initiate a mitigation action regarding the device. For example, the service may generate a firewall rule to block the device, redirect traffic from the device to a honeypot, send an alert, or the like. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to detect device type spoofing by endpoint devices in a network. In doing so, the techniques herein can help to protect the network from malicious actors who may try to gain greater access by spoofing other types of devices.

While there have been shown and described illustrative embodiments that provide for the detection of device type spoofing, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device classification service, device telemetry data indicative of declarative attributes of a device in a network and indicative of behavioral attributes of that device;
   labeling, by the device classification service, the device with a device type, based on the device telemetry data;
   detecting, by the device classification service, device type spoofing exhibited by the device using a model that models a relationship between the declarative attributes and the behavioral attributes, wherein the model takes the behavioral attributes as input and predicts declarative attributes to be compared with the declarative attributes obtained from the device telemetry data, and wherein the device type spoofing is detected when there is a discrepancy between the declarative attributes predicted by the model and the declarative attributes obtained from the device telemetry data; and
   initiating, by the device classification service and based on the device type spoofing, a mitigation action regarding the device.

2. The method as in claim 1, wherein the mitigation action comprises generating a firewall rule to block the device or sending an alert.

3. The method as in claim 1, wherein the relationship between the declarative attributes and the behavioral attributes comprises a probability of the declarative attributes given the behavioral attributes.

4. The method as in claim 1, wherein the model comprises a joint conditional likelihood function trained using a neural network.

5. The method as in claim 1, wherein detecting device type spoofing by the device further comprises:
   applying clustering to the behavioral attributes of the device, to assign the device to one or more device clusters over time; and
   detecting when the device alternates between assigned device clusters.

6. The method as in claim 1, further comprising:
   deploying an encoder of the autoencoder for execution by a networking element in the network, wherein the networking element uses the encoder to generate a compressed representation of the behavioral attributes of the device for inclusion in the device telemetry data to be sent to the device classification service.

7. The method as in claim 1, wherein labeling the device with a device type, based on the device telemetry data, comprises:
   using the declarative attributes of the device to assign a type label to the device.

8. The method as in claim 7, wherein detecting device type spoofing by the device further comprises:
   using the behavioral attributes of the device as input to a machine learning classifier, to predict a predicted type label assigned to the device; and
   comparing the predicted type label to the type label assigned to the device.

9. An apparatus, comprising:
   one or more network interfaces;
   a processor coupled to the one or more network interfaces and configured to execute one or more processes; and
   a memory configured to store a process that is executable by the processor, the process when executed configured to:
   obtain device telemetry data indicative of declarative attributes of a device in a network and indicative of behavioral attributes of that device;
   label the device with a device type, based on the device telemetry data;
   detect device type spoofing exhibited by the device using a model that models a relationship between the declarative attributes and the behavioral attributes, wherein the model takes the behavioral attributes as input and predicts declarative attributes to be compared with the declarative attributes obtained from the device telemetry data, and wherein the device type spoofing is detected when there is a discrepancy between the declarative attributes predicted by the model and the declarative attributes obtained from the device telemetry data; and
   initiate a mitigation action regarding the device, based on the device type spoofing.

10. The apparatus as in claim 9, wherein the relationship between the declarative attributes and the behavioral attributes comprises a probability of the declarative attributes given the behavioral attributes.

11. The apparatus as in claim 9, wherein the model comprises a joint conditional likelihood function trained using a neural network.

12. The apparatus as in claim 9, wherein the apparatus detects device type spoofing by the device further by:
   applying clustering to the behavioral attributes of the device, to assign the device to one or more device clusters over time; and
   detecting when the device alternates between assigned device clusters.

13. The apparatus as in claim 9, wherein the process when executed is further configured to:
   deploy an encoder of the autoencoder for execution by a networking element in the network, wherein the networking element uses the encoder to generate a compressed representation of the behavioral attributes of the device for inclusion in the device telemetry data to be sent to the apparatus.

14. The apparatus as in claim 9, wherein the apparatus labels the device with a device type, based on the device telemetry data, by:

using the declarative attributes of the device to assign a type label to the device.

15. The apparatus as in claim 14, wherein the apparatus detects device type spoofing by the device further by:

using the behavioral attributes of the device as input to a machine learning classifier, to predict a predicted type label assigned to the device; and comparing the predicted type label to the type label assigned to the device.

16. A tangible, non-transitory, computer-readable medium storing program instructions that cause a device classification service to execute a process comprising:

obtaining, by the device classification service, device telemetry data indicative of declarative attributes of a device in a network and indicative of behavioral attributes of that device;

labeling, by the device classification service, the device with a device type, based on the device telemetry data;

detecting, by the device classification service, device type spoofing exhibited by the device using a model that models a relationship between the declarative attributes and the behavioral attributes, wherein the model takes the behavioral attributes as input and predicts declarative attributes to be compared with the declarative attributes obtained from the device telemetry data, and wherein the device type spoofing is detected when there is a discrepancy between the declarative attributes predicted by the model and the declarative attributes obtained from the device telemetry data; and initiating, by the device classification service and based on the device type spoofing, a mitigation action regarding the device.

\* \* \* \* \*

UNITED STATES PATENT AND TRADEMARK OFFICE
CERTIFICATE OF CORRECTION

PATENT NO. : 11,729,210 B2
APPLICATION NO. : 16/851290
DATED : August 15, 2023
INVENTOR(S) : Jean-Philippe Vasseur et al.

It is certified that error appears in the above-identified patent and that said Letters Patent is hereby corrected as shown below:

In the Specification

Column 13, Line 35, please amend as shown:
(e.g., Apple TV are often confused with Amazon TV or Sony PS4

Column 14, Line 58, please amend as shown:
by an endpoint device. More specifically, for a given device Column 15, Line 22, please amend as shown:
some embodiments, SDC 608 may send an alert to a UI 508, Column 16, Line 56, please amend as shown:
For instance, in order to spoof a Cisco IP Phone, an Column 17, Line 49, please amend as shown:
via a UI 508, could be used by NAP 610 to re-adjust the Column 17, Line 52, please amend as shown:
(e.g., from an edge-located encoder), or computing the code Signed and Sealed this
Sixteenth Day of April, 2024

Katherine Kelly Vidal
*Director of the United States Patent and Trademark Office*